US012743918B1

(12) United States Patent
Aragona et al.

(10) Patent No.: US 12,743,918 B1
(45) Date of Patent: Sep. 22, 2026

(54) METHODS AND SYSTEMS FOR FACILITATING ACCESS TO MEMBERSHIP-BASED VENUES

(71) Applicants: Clinten Jude Aragona, Bridgeport, WV (US); Ashley Jennell Aragona, Bridgeport, WV (US)

(72) Inventors: Clinten Jude Aragona, Bridgeport, WV (US); Ashley Jennell Aragona, Bridgeport, WV (US)

( * ) Notice: Subject to any disclaimer, the term of this patent is extended or adjusted under 35 U.S.C. 154(b) by 0 days.

(21) Appl. No.: 18/778,421

(22) Filed: Jul. 19, 2024

Related U.S. Application Data

(60) Provisional application No. 63/591,846, filed on Oct. 20, 2023, provisional application No. 63/527,613, filed on Jul. 19, 2023.

(51) Int. Cl.
*G07C 9/25* (2020.01)
*G06F 11/34* (2006.01)

(52) U.S. Cl.
CPC ............ *G07C 9/25* (2020.01); *G06F 11/3438* (2013.01)

(58) Field of Classification Search
CPC .............................. G07C 9/25; G06F 11/3438
See application file for complete search history.

(56) References Cited

U.S. PATENT DOCUMENTS 8,083,643 B2 12/2011 Ng et al.
10,506,401 B1 * 12/2019 Tuomikoski ............ H04L 67/55
11,232,662 B2 * 1/2022 Slavic ...................... G07C 9/29
2003/0009376 A1 1/2003 Ekstrom
2015/0339871 A1 * 11/2015 Wagner .................... G07C 9/20 340/5.81
2016/0203421 A1 * 7/2016 Batory .................... H04W 4/02 705/5
2018/0160306 A1 * 6/2018 Gupta ................ G06Q 20/3223
2023/0201666 A1 * 6/2023 Yoo ........................ G16H 10/20 482/9

FOREIGN PATENT DOCUMENTS

| | | | |
|---|---|---|---|
| CN | 104318358 | A | 1/2015 |
| CN | 206849105 | U | 1/2018 |
| EP | 2347804 | B1 | 3/2016 |
| KR | 20170123427 | A | 11/2017 |
| KR | 20190029430 | A | 3/2019 |
| KR | 20200101032 | A | 8/2020 |
| TR | 2021019152 | A2 * | 12/2021 |

* cited by examiner

*Primary Examiner* — Sonji N Johnson
(74) *Attorney, Agent, or Firm* — John Rizvi; John Rizvi, P.A.—The Patent Professor®

(57) ABSTRACT

Computer-implemented methods for facilitating an access to a membership-based venue are provided. In response to determining that a mobile application, associated with the membership-based venue, is downloaded at a user device, a membership of the membership-based venue to a user associated with the user device is automatically granted. One or more offers associated with the membership-based venue are sent to the user via the mobile application. An access to the membership-based venue is provided for a limited amount of time in a period of time by sending the one or more offers. Corresponding systems and devices are also provided.

15 Claims, 8 Drawing Sheets

Figure 5:
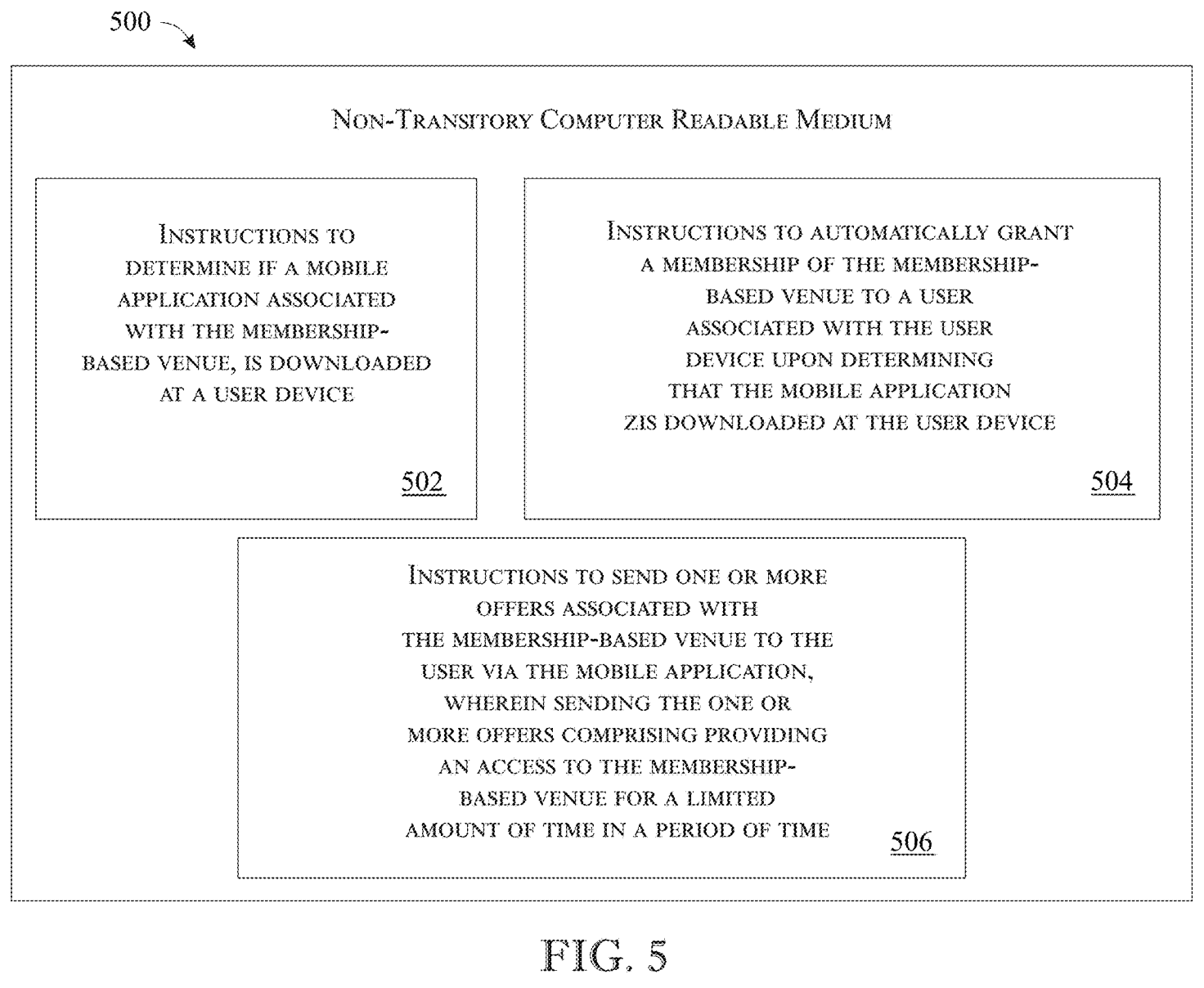

500

NON-TRANSITORY COMPUTER READABLE MEDIUM

INSTRUCTIONS TO DETERMINE IF A MOBILE APPLICATION ASSOCIATED WITH THE MEMBERSHIP-BASED VENUE, IS DOWNLOADED AT A USER DEVICE

502

INSTRUCTIONS TO AUTOMATICALLY GRANT A MEMBERSHIP OF THE MEMBERSHIP-BASED VENUE TO A USER ASSOCIATED WITH THE USER DEVICE UPON DETERMINING THAT THE MOBILE APPLICATION ZIS DOWNLOADED AT THE USER DEVICE

504

INSTRUCTIONS TO SEND ONE OR MORE OFFERS ASSOCIATED WITH THE MEMBERSHIP-BASED VENUE TO THE USER VIA THE MOBILE APPLICATION, WHEREIN SENDING THE ONE OR MORE OFFERS COMPRISING PROVIDING AN ACCESS TO THE MEMBERSHIP-BASED VENUE FOR A LIMITED AMOUNT OF TIME IN A PERIOD OF TIME

602
LOGO
CHECK IN
ALLOW "APP" TO USE YOUR LOCATION?
: ON
ALLOW ONCE
ALLOW WHILE USING APP
DON'T ALLOW
RESOURCES
CHAT
CHECK-IN
PROGRAM
PROGRESS

METHODS AND SYSTEMS FOR FACILITATING ACCESS TO MEMBERSHIP-BASED VENUES

CROSS-REFERENCE TO RELATED APPLICATIONS

This application claims the benefit of U.S. Provisional Patent Application Ser. No. 63/527,613 filed on Jul. 19, 2023, and U.S. Provisional Patent Application Ser. No. 63/591,846 filed on Oct. 20, 2023, both of which are incorporated by reference herein in their entirety.

FIELD OF THE INVENTION

The present invention relates to access control, and more particularly to computer-implemented methods and systems for providing access to a membership-based venue.

BACKGROUND OF THE INVENTION

Existing methods for onboarding new members in venues comprising memberships have been time-consuming and cumbersome. Individuals seeking membership undergo a registration process that involves paperwork, manual data entry, physical identification cards or other tangible membership tokens. The physical identification cards restrict access to the venues, as members must carry the physical identification cards at all times. Forgetting or losing the physical identification cards may prevent entry, frustrating members and reducing attendance. Such methods may not only discourage potential members from joining the venues but may also pose administrative challenges.

Managing and verifying the physical identification cards may necessitate administrative efforts and resources. The manual verification process may be prone to errors or delays. Moreover, existing membership platforms may lack the flexibility to adapt to dynamic needs and preferences of individual users. The membership platforms may frequently necessitate a one-size-fits-all approach, where all the members receive the same benefits and access to the venues, irrespective of unique interests, needs, or participation levels of the members. The lack of personalization may result in underutilized memberships and reduced member satisfaction.

As the expectations of modern consumers continue to evolve, there is a growing demand for more convenient and adaptable membership solutions. Existing sales and marketing approaches in the venues comprising memberships may lack the ability to adapt to changing consumer needs.

Thus, there is a need for methods and systems to address the above noted problems in onboarding new members in the venues comprising memberships. For example, there is a need for methods and systems for easing the membership process and enabling access to the membership-based venues. There is also a need for methods and systems to enhance interest and engagement of the users in the membership-based venues. Further, there is a need for methods and systems to retain membership of the members of the membership-based venues.

SUMMARY OF THE INVENTION

The present invention is directed to a computer implemented method for facilitating an access to a membership-based venue. The method comprises: determining, by a computing engine, if a mobile application associated with the membership-based venue, is downloaded at a user device; and in response to determining that the mobile application associated with the membership-based venue is downloaded at the user device: automatically granting, by the computing engine, a membership of the membership-based venue to a user associated with the user device; and sending, by the computing engine, one or more offers associated with the membership-based venue to the user via the mobile application, wherein sending the one or more offers comprises providing an access to the membership-based venue for a limited amount of time in a period of time.

In an aspect, the membership-based venue may be a fitness center.

In an aspect, automatically granting the membership of the membership-based venue may comprise granting, by the computing engine, a casual membership to the user.

In an aspect, the method may further comprise: providing, by the computing engine, via the mobile application, an option of upgrading the casual membership to a full-time membership to the user; and in response to receiving the user response to the option, upgrading the membership of the user from the casual membership to the full-time membership.

In an aspect, providing the access to the membership-based venue may comprise providing the access to the membership-based venue for one day per month.

In an aspect, the method may further comprise: monitoring, by the computing engine, user activity on the mobile application; processing, by the computing engine, the user activity, and generating and sending personalized recommendations to the user, via the mobile application, based on processing the user activity.

In an aspect, the method may further comprise: tracking, by the computing engine, location of the user upon obtaining user permissions, determining, by the computing engine, based on the tracking that the user is present at the membership-based venue; and enabling, by the computing engine, providing a real-time personalized experience at the membership-based venue to the user based on determining that the user is present at the membership-based venue.

In an aspect, providing the access to the membership-based venue may comprise providing one or more of: a barcode, a QR code, a one-time password, a PIN, or a passcode to the user, via the mobile application, which enables the user to access the membership-based venue.

In an aspect, automatically granting the membership of the membership-based venue may comprise providing a guest pass to the user.

In an aspect, providing the access to the membership-based venue may comprise utilizing biometric authentication, such as fingerprint, palm print, iris scan, retina scan, facial recognition, or the like.

In an aspect, the user activity may indicate interests and personal preferences of the user.

In an aspect, applying a sales funnel in the mobile application to generate and provide the one or more offers associated with the membership-based venue to the user.

In an aspect, the one or more offers may feature a minimum risk reversal factor.

The present invention is also directed to a non-transitory computer-readable storage medium comprising instructions executable by a processor, the instructions to cause the processor to perform or control performance of methods disclosed herein.

The present invention is also directed to a computing engine that comprises a memory to store instructions; and one or more processors to execute the instructions stored in the memory to perform or control performance of operations that comprise: determine if a mobile application associated with a membership-based venue, is downloaded at a user device; and in response to determining that the mobile application associated with the membership-based venue is downloaded at the user device: automatically grant a membership of the membership-based venue to a user associated with the user device; and send one or more offers associated with the membership-based venue to the user via the mobile application, wherein the one or more offers comprise an access to the membership-based venue for a limited amount of time in a period of time.

In an aspect, the membership may be a casual membership.

In an aspect, the operations may further comprise provide an option of upgrading the casual membership to a full-time membership to the user; and in response to receipt of a user response to the option, upgrading the membership of the user from the casual membership to the full-time membership.

In an aspect, the access may be for one day per month.

In an aspect, the operations may further comprise: monitor user activity on the mobile application; process the user activity, and generate and send personalized recommendations to the user, via the mobile application, based on the user activity.

In an aspect, the operations may further comprise: track location of the user upon obtaining user permissions; determine, based on the tracking, that the user is present at the membership-based venue; and enable providing a real-time personalized experience at the membership-based venue to the user based on determining that the user is present at the membership-based venue.

In an aspect, the operation to provide the access may comprise an operation to provide one or more of: a barcode, a QR code, a one-time password, a PIN, or a passcode to the user, via the mobile application, which enables the user to access the membership-based venue.

In an aspect, the operation to automatically grant the membership of the membership-based venue may comprise an option to provide a guest pass to the user.

In an aspect, the operation to provide the access to the membership-based venue may comprise an operation to utilize biometric authentication.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 5 shows a non-transitory computer readable medium comprising instructions executable by a processor to perform or control performance of operations of an example method of the present disclosure.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. The term “comprising” can also encompass the terms “consisting essentially of” and “consisting of”. Furthermore, there is no intention to be bound by any expressed or implied theory presented in the preceding technical field, background, brief summary or the following detailed description. It is also to be understood that the specific methods, devices, and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed towards a computer implemented method for facilitating access to a membership-based venue. A mobile application associated with the membership-based venue is downloaded at a user device. A membership of the membership-based venue is automatically granted to a user associated with the user device upon download of the mobile application. In some embodiments, a guess pass or guest access is automatically granted to the user associated with the user device upon download of the mobile application. One or more offers associated with the membership-based venue are sent to the user via the mobile application, to access the membership-based venue for a limited amount of time in a period of time. The method and various operations involved in the method flow are performed by a computing engine, such as computing engine, 345, or 400 as shown in some of the drawings. The mobile application may be implemented as 200, 305, 602, 604, 606, 608, 610, or 612 as shown in some of the drawings.

Figure 1:
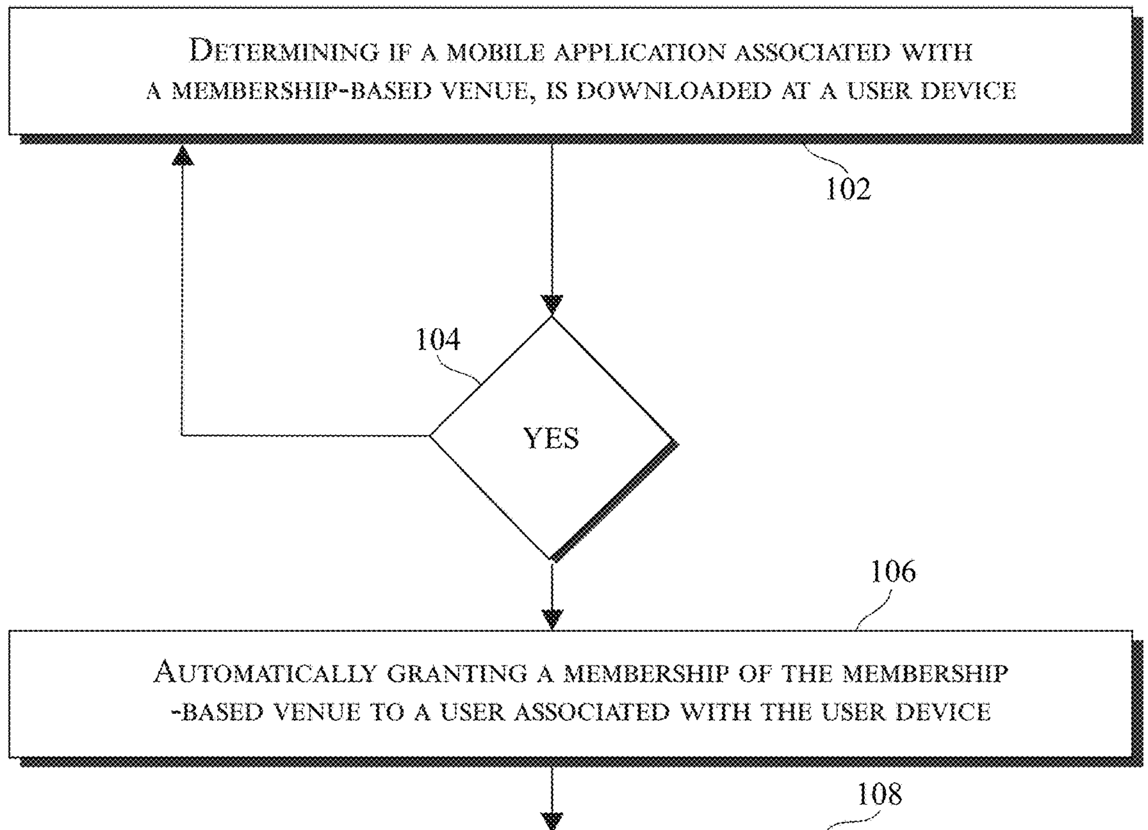
FIG. 1 shows a flowchart of an example method, in accordance with some embodiments of the present disclosure.

Referring initially to FIG. 1, which shows a flowchart of an example method, in accordance with some embodiments of the present disclosure. The flowchart comprises a method 100 that when performed, facilitates access to a membership-based venue. The membership-based venue may be a fitness center, a gymnasium ("gym"), a club, or the like. The method may be performed or controlled by a computing engine such as computing engine 345 (shown in FIG. 3) or computing engine 400 (shown in FIG. 4).

The computing engine 345, 400 may be a server. The server may refer to a computer or system that provides services or resources to other computers or users on a network. Some other non-limiting examples of the computing engine may be one or more of a host, a node, a machine, a system, a computer, a platform, a backend, or a computer application. The computing engine 345, 400 may be implemented using hardware, software, or a combination of hardware and software. The computing engine 345, 400 may also be implemented using or on a cloud server. Moreover, the computing engine 345, 400 may further be implemented using cloud computing. In some implementations, one or more functions of the computing engine 345, 400 may be performed by one or more components of the cloud server. In some embodiments, the computing engine 345, 400 may be an artificial intelligence based or an AI-based engine. In some embodiments, the AI-based engine may comprise or implemented a trained machine learning (ML) model.

The method 100 begins at block 102, where it is determined if a mobile application associated with the membership-based venue is downloaded at a user device, for example user device 310. The user device may be any electronic device, such as but not limited to, a mobile device, a smartphone, a laptop, a tablet, or the like.

In response to determining, at block 104, that the mobile application is download at the user device, a membership of the membership-based venue is automatically granted to a user associated with the user device at block 106. In some embodiments, upon downloading of the mobile application, the user associated with the user device may be enabled to provide basic details such as name and email address, which facilitates granting of the membership to the user. For example, a user interface may be rendered by the mobile application on the user device, under control of the computing engine, which may enable the user to provide the name and email address. Upon receiving of the name and email address of the user, the user may be sent information indicative of the membership of the user by the computing engine via the mobile application. For the user to be granted membership of the membership-based venue, and thereby limited access to the membership-based venue, the user does not have to provide details such as identification information, documents, financial information or the like.

By automatically granting the membership to the user upon downloading the mobile application at the user device, the membership process may be seamless. Lengthy paperwork or physical card issuance may not be required for the user to access the membership-based venue. The user may immediately access the facilities or services provided by the membership-based venue according to preferences and interests of the user, thus enhancing user satisfaction and convenience. The download of the mobile application at the user device may serve as a form of digital authentication, verifying the eligibility of the user for membership or access to the membership-based venue.

Further, the download of the mobile application may simplify membership management of members of the membership-based venue. A real-time record of new memberships may be maintained, thereby rendering easy monitoring and management of the memberships. Information such as the number of downloads, location of the user, and interests and preferences of the user may be recorded to provide personalized recommendations and advertisements to the user. The mobile application may offer personalized content, promotions, or notifications to the user in order to enhance the interest of the user to access the membership-based venue.

In an aspect, the membership of the membership-based venue granted to the user may comprise a casual membership. As stated above, the user may provide basic information such as, but not limited to, name, profile picture, email address, or contact details, which may enable the computing engine to provide information indicative of the casual membership to the user. Further, the user may be enabled by the mobile application to create a virtual badge representing the casual membership of the user. The virtual badge may comprise the profile picture of the user. The virtual badge may be utilized as a virtual check in card, at the membership-based venue, by the user. The user may also use the virtual badge for a virtual check-in into the mobile application associated with the membership-based venue.

In an aspect, the casual membership may be a guest pass for the user to access the venue. In some embodiments, the guest pass may be used for once every certain duration of time e.g., once every month.

Further, the user may browse through a selection of badge templates or icons provided by the mobile application. The virtual badge may include designations indicating new member, premium user, top contributor, or verified expert. Further, the user may upload a custom image or design to be used on the virtual badge. The user may further personalize the virtual badge by selecting colors, adding text or labels, or positioning the badge on a user profile.

Furthermore, one or more offers associated with the membership-based venue are sent to the user via the mobile application at block 108. The user activity on the mobile application and through the mobile application may be tracked and processed. The user activity on the mobile application or on the user device may indicate interests and preferences of the user. Personalized recommendations may be then generated and sent to the user based on processing the user activity.

In some embodiments, the casual membership may allow the user to access the membership-based venue for a limited amount of time in a period of time. For instance, the casual membership may be accompanied with a one-day monthly pass, which may enable the user to access the membership-based venue for a one day in a month, without any cost. Further, the user may be provided, under control of the computing engine, one or more of: a barcode, a QR code, a one-time password, a PIN, a virtual badge, a virtual key-card, or a passcode on the mobile application, which enables the user to access the membership-based venue. In some embodiments, the access to the membership-based venue may be based on utilizing biometric authentication, such as fingerprint, palm print, iris scan, retina scan, facial recognition, or the like. Simply stated, the user with the casual membership may be enabled to access the membership-based venue after the biometric authentication.

Furthermore, in some embodiments, user actions on the mobile application, such as, but not limited to, content views, searches, or interactions with features and services of the mobile application, may be observed and recorded by the computing engine. As stated previously, the computing engine may comprise AI engine, which may employ the trained ML model. The AI-based computing engine may utilize advanced algorithms and machine learning techniques to process the user activity on the mobile application in order to extract insights related to the user behavior, interests, or preferences. Upon processing the user activity on the mobile application, the AI-based computing engine may employ sophisticated data modeling and pattern recognition techniques to discern recurring behaviors, identify trends, or predict future user actions.

By comprehensively analyzing the user activity on the mobile application, the AI-based computing engine may identify interests, needs, or goals of the user, thereby generating personalized recommendations for the user. The recommendations may comprise offers, plans, content, or services for the user based on the user activity on the mobile application. In some embodiments, the membership-based venue may comprise a fitness center. In such cases the recommendations may also comprise personalized workout routines, fitness class suggestions, event notifications, special promotions, or relevant content tailored to the specific interests and goals of the user, thus enhancing user satisfaction and encouraging further engagement in the membership-based venue.

According to an embodiment of the present invention, the one or more offers associated with the membership-based venue for the user may be generated by the AI-based computing engine. Simply stated, the sales funnel may be incorporated into the mobile application in order to enhance the marketing and sales efficiency of the membership-based venue. The incorporation of the sales funnel into the mobile application may allow targeted outreach or incentive-based promotions to encourage downloads and availing of full-time membership by the user.

Further, the incorporation of sales funnel in the mobile application may enable the membership-based venue (e.g., fitness center) administrator to send targeted emails or messages to the user regarding offers, promotions, group fitness classes, free passes for accessing the membership-based venue, personal training options, membership upgrade reminders, childcare hours, family activity hours, or like. Moreover, targeted notifications to the user regarding offers, promotions, group fitness classes, free passes for accessing the membership-based venue, personal training options, membership upgrade reminders, childcare hours, family activity hours, or the like may also be sent.

In an aspect, location of the user may be tracked by the computing engine upon obtaining user permissions. If it is determined, based on the tracking, that the user is present at the membership-based venue such as the fitness center, a real-time personalized experience may be provided to the user by employing personal trainers or coaches for the user. The personal trainers or coaches may assist the user in workout routines or fitness classes that are of interest to the user based upon the user activity on the mobile application. The user activity may be tracked by the AI-based computing engine associated with the mobile application. The real-time personalized experience at the membership-based venue may enhance the interest of the user to upgrade the casual membership to a full-time membership.

Furthermore, in some embodiments, the user may be provided with an option of upgrading the casual membership to the full-time membership. In response to receiving the user response to the option, the membership of the user may be upgraded from the casual membership to the full-time membership. The user may provide additional details, such as, but not limited to, address of the user, financial information, health details such as height, weight, or medical history, or fitness goals, which may enable the computing engine associated with the mobile application of the membership-based venue to provide the full-time membership to the user. The full-time membership may comprise one or more personalized plans, recommendations or offers based on the interests and preferences of the user. Most importantly, the full-time membership may provide the user with unlimited access to the membership-based venue.

According to some embodiments of the present invention, the AI-based computing engine may further engage the user, for example through AI chatbot presented by the computing engine via the mobile application, in one or more conversations based on the one or more offers generated for the user, in order to increase the probability of the user converting the casual membership to the full-time membership. Thus, the sales funnel incorporated into the mobile application may enhance the marketing and sales efficiency of the membership-based venue. The incorporation of the sales funnel into the mobile application may further allow targeted outreach or incentive-based promotions to encourage downloads and availing of the full-time membership by the user.

In some embodiments, the computing engine may interface with a payment gateway for users to submit payment through their respective devices. The payment may be associated with upgrading casual membership to full time membership. The payment gateway may enable the users to submit the payments using a debit card, credit card, internet banking, digital wallet, or mediums such as PayPal™ or the like. The payment gateway may securely collect user's payment information and then send it to a financial institution in order to perform the transaction.

After the payment confirmation, a notification may be sent by the computing engine to the user device, the notification being indicative of the purchase being successful. In some embodiments, the notification comprises a pop-up notification. In some embodiments, the notification comprises a mobile push notification, which may be a visual, audio, or a haptic notification.

Figure 2:
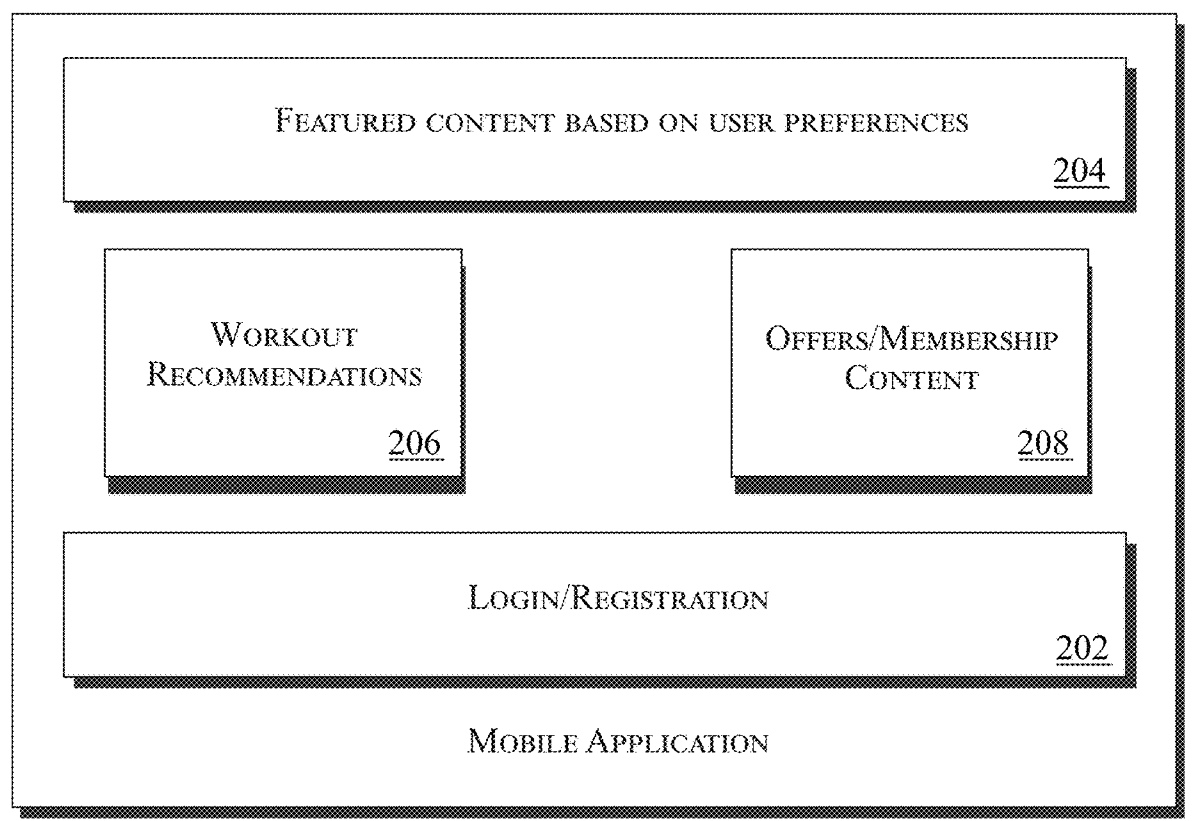
FIG. 2 shows an exemplary block diagram representation of a mobile application involved in the functioning of the method of the present disclosure, in accordance with some embodiments of the present disclosure.

FIG. 2 shows an exemplary block diagram representation of a mobile application 200 associated with the methods, for example method 100, of the present disclosure, in accordance with some embodiments of the present disclosure. The mobile application 200 may be controlled by the computing engine 345, 400 at the backend, which may enable the mobile application 200 to perform or control performance of operations as described herein. The mobile application 200 may serve as a digital gateway that may connect users to the offers, services, or experiences offered by the membership-based venue. The mobile application 200 may immediately grant membership to the users downloading the mobile application at the respective user devices. The membership may be a casual membership allowing the users to access the membership-based venue for one day per month with automated renewal every month.

The users may login or register into the mobile application 200 via a login/registration module 202. The login/registration module 202 may allow the users to enter user credentials, comprising a username, a contact number, a profile picture, or an email address and a password into the mobile application 200 in order to login/register with the mobile application 200. New users may download and launch the mobile application 200, and may sign-up or register into the mobile application 200 by providing basic details such as, a user name, a contact number, an email address, or a password in order to receive the casual membership of the membership-based venue. The registered users may login into the mobile application 200 by entering the username and the password. The username may comprise a name of the user, a contact number of the user, or an email address of the user.

The mobile application 200 may securely communicate with backend servers, where user data may be stored, in order to verify the user credentials. Upon successful login, the users may automatically be provided the casual membership of the membership-based venue, thereby facilitating the users to access the personalized services and offers provided by the membership-based venue via the mobile application 200.

According to an embodiment of the present invention, as part of the login/registration process, the mobile application 200 may prompt the users to enter a one-time-password (OTP) or a verification code received via an email or an SMS into the mobile application 200, in order to authenticate the users, thereby ensuring a multi-factor authentication. Further, the users may also be prompted to review and accept the terms and conditions, privacy policy, or membership agreement of the membership-based venue. Upon successful registration/login, the users may add further details, such as profile pictures, fitness goals, interests, or preferences of the users into the mobile application 200 thereby creating a user profile. The users may further create a virtual badge, via the mobile application 200, in order to access the membership-based venue by utilizing the virtual badge as a virtual check-in key card.

Further, the users may receive personalized content or recommendations based on the interests, preferences, or goals of the users via module 204. The mobile application 200 may provide tailored and personalized content to the users through advanced AI algorithms and data analytics that may continually monitor and analyze user behavior and preferences on the mobile application 200. As the users interact with the mobile application 200, activity of the users, such as browsing specific classes, attending events, or engaging with content, may be meticulously tracked, and recorded by the AI-based computing engine associated with the mobile application 200 in order to provide featured content to the users based on the user activity.

Furthermore, the mobile application 200 may recommend workout routines or fitness plans to the users via module 206. The workout recommendations may align with the fitness goals, interests, or preferences of the users based on the user activity tracked by the AI-based computing engine associated with the mobile application 200. The workout recommendations may comprise strength training workouts, cardio sessions, yoga classes, or specialized programs. The user activity indicating interest of the users in events, classes, or workshops may enable the computing engine to provide targeted recommendations to the users based on the past attendance, interests, or availability.

In addition, personalized promotions, special offers or membership content may be presented to the users via a module 208 of the mobile application 200 based on purchasing history, interests, activity, or location of the users. The users may receive relevant and enticing offers with a minimal risk reversal factor by incorporation of the sales funnel in the mobile application 200. Moreover, the mobile application 200 may curate a library of articles, videos, or educational content related to health, wellness, and the membership-based venue-specific topics for the users. The users may receive offers/membership content tailored to the areas of interest of the users. The users interested in community engagement may receive recommendations for joining specific groups or forums within the mobile application 200. For users seeking to improve dietary habits, the mobile application 200 may provide personalized nutritional guidance, comprising meal plans, recipes, or dietary tips based on the dietary preferences and fitness goals of the users.

Figure 3:
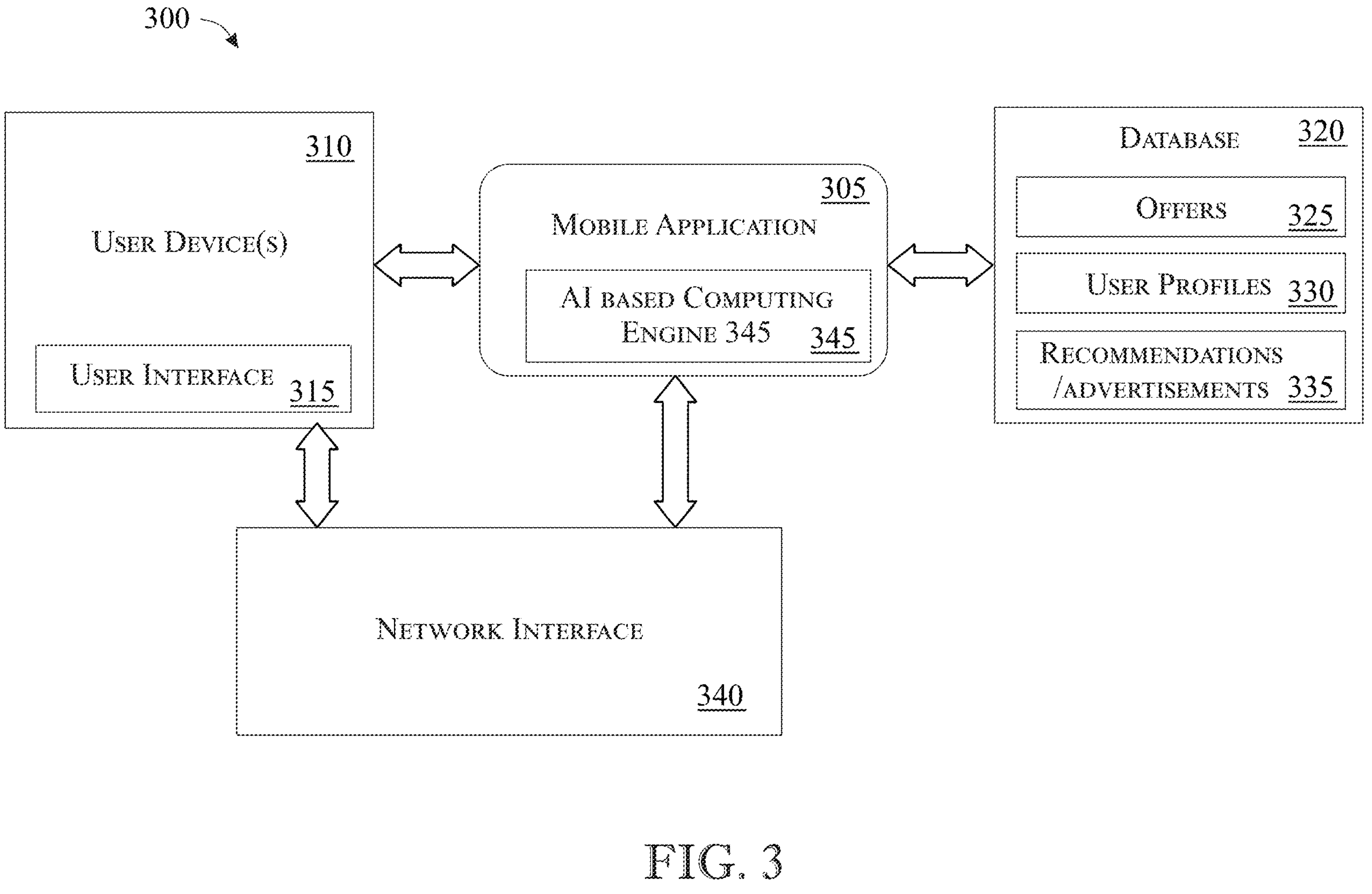
FIG. 3 shows an exemplary block diagram representation of a system within which certain features of the present disclosure can be implemented, in accordance with some embodiments of the present disclosure.

FIG. 3 shows an exemplary block diagram representation of a system 300 within which certain features of the present disclosure may be implemented, in accordance with some embodiments of the present disclosure. Facilitating access to the membership-based venue may involve a seamless interaction between multiple components of the system 300 such as, a mobile application 305, user devices 310 comprising a user interface 315, a database 320 and a network interface 340.

The mobile application 305 is downloaded on the user devices 310 associated with the users. The user devices 310 may comprise the user interface 315 enabling seamless integration of various components and functions on the user devices 310.

The mobile application 305 may be similar in functioning and configuration to the mobile application 200 as described above in detail with relation to FIG. 2. The mobile application 305 may serve as a digital membership card, allowing the users to present the smartphone for access to the membership-based venue. Further, in an aspect, the mobile application 305 may utilize biometric recognition, such as fingerprint or facial recognition, to authenticate users quickly and securely, ensuring only authorized individuals gain access to the membership-based venue. The mobile application 305 may also provide virtual tours or interactive maps to help users virtually navigate the membership-based venue. The mobile application 305 may also manage loyalty programs, offering rewards or discounts to the users based on the engagement and participation of the users within the membership-based venue.

According to some embodiments of the present invention, the mobile application 305 may be implemented as a web-based portal accessible through internet browsers. The users may log in via computers or mobile devices to manage memberships, access services, or receive personalized content. In addition, online member portals may be designed for desktop or laptop use. The online member portals may provide similar functionality as that of the mobile application 305, thus allowing the users to manage the memberships and access services related to the membership-based venue. In an aspect, the mobile application 205 may provide a virtual badge to the users, thereby allowing the users to utilize the virtual badge for a virtual check-in into the mobile application 205, or a physical check-in into the membership-based venue. The users may utilize the virtual badge as a virtual key-card for access to the membership-based venue. Further, a dedicated membership website may also offer a comprehensive platform for registration, management, and access to the membership-based venue. The users may log in from various devices to access the user account and the membership-based venue services. For the membership-based venue with the mobile application 305, an in-app browser may also be integrated, allowing the users to access web-based services or make online reservations without leaving the mobile application 305.

Further, an AI-based computing engine 345 is associated with the mobile application 305 at the backend. The AI-based computing engine 345 may track the user activity by aggregating user data comprising login histories, click-streams, preferences, or event attendance records through the mobile application 305. The AI-based computing engine 345 may utilize advanced machine learning algorithms, to recognize patterns and trends within the user behavior to build comprehensive user profiles 330 that may be stored in the database 320. The AI-based computing engine 345 may also provide personalized recommendations/advertisements 335 to the user based on the user activity on the mobile application 305. In addition, the AI-based computing engine 345 may also provide personalized offers 325 to the users based on the user activity indicating interests, preferences, or fitness goals of the user. Moreover, the AI-based computing engine 345 may also provide personalized content, event suggestions, promotions, or workout plans to the user. In an aspect, the AI-based engine may engage the users in a conversation as per the interest or preferences of the users, thereby increasing sales efficiency of the membership-based venue.

In addition, the AI-based computing engine 345 may also ensure security and user data privacy by employing encryption, authentication mechanisms, and stringent security protocols to safeguard sensitive user information.

The database 320 may comprise the personalized offers 325, the user profiles 330, or the recommendations/advertisements 335. The database 320 may serve as a repository enabling the functionality of the mobile application 305. The user profiles 330 within the database 320 may comprise personal details of the users, such as, but not limited to, full name, contact information (email address or phone number), date of birth, or profile picture. Additionally, the user profiles 330 may also comprise fitness goals, preferences, past attendance records, or membership history of the users. The user profiles 330 may also comprise data related to individual interactions within the mobile application 305, such as, login histories, event attendance, class bookings, content engagement, or user preferences. Moreover, the user profiles 330 may also comprise authentication credentials, such as usernames and hashed passwords, to enable secure user logins and protect user accounts.

The recommendations/advertisements 335 may comprise recommendations and advertisements provided by the AI-based computing engine 345. The recommendations/advertisements 335 may comprise content, events, classes, or promotions tailored to preferences and interests of the users. The recommendations/advertisements 335 may also comprise information about advertisement campaigns, targeting criteria, and user interactions with advertisements.

The personalized offers 325 may comprise discounts, special promotions, or membership renewal incentives. Each offer of the personalized offers 325 may be associated with specific user segments, ensuring that the right offers reach the right users. The database 320 may comprise information about the users eligible for particular personalized offers 325 based on factors like membership type, duration, or activity levels. Further, data related to the redemption and usage of the personalized offers 325 may also be tracked, enabling analysis of offer effectiveness and user engagement.

Various components of the system 300 may interact with each other over the network interface 340 that may ensure seamless and secure data exchange among the components. The network interface 340 may employ standard data transmission protocols, such as HTTPS (Hypertext Transfer Protocol Secure) for secure communication over the internet. The data transmitted over the network interface 340 may be encrypted using industry-standard encryption algorithms. Application Programming Interfaces (APIs) may also serve as communication endpoints that may enable the components of the system 300 to interact with each other. Secure user authentication processes, comprising token-based authentication or OAuth (Open Authorization), may also be employed to verify the identity of the users and authorized components. Further, integration with external services, such as payment gateways or third-party APIs may also be facilitated through secure communication channels.

The network interface 340 may manage one or more communication protocols governing the format and structure of data exchange between the components. Further, the network interface 340 may employ encryption and security measures to protect sensitive information. The network interface 340 may also allow scalability of the system, by allowing addition of new components, modules, or devices without disrupting the existing communication infrastructure. The network interface 340 may also manage error handling and redundancy mechanisms. The network interface 340 may utilize various communication channels such as, local area networks (LAN), wide area networks (WAN), or the internet.

Figure 4:
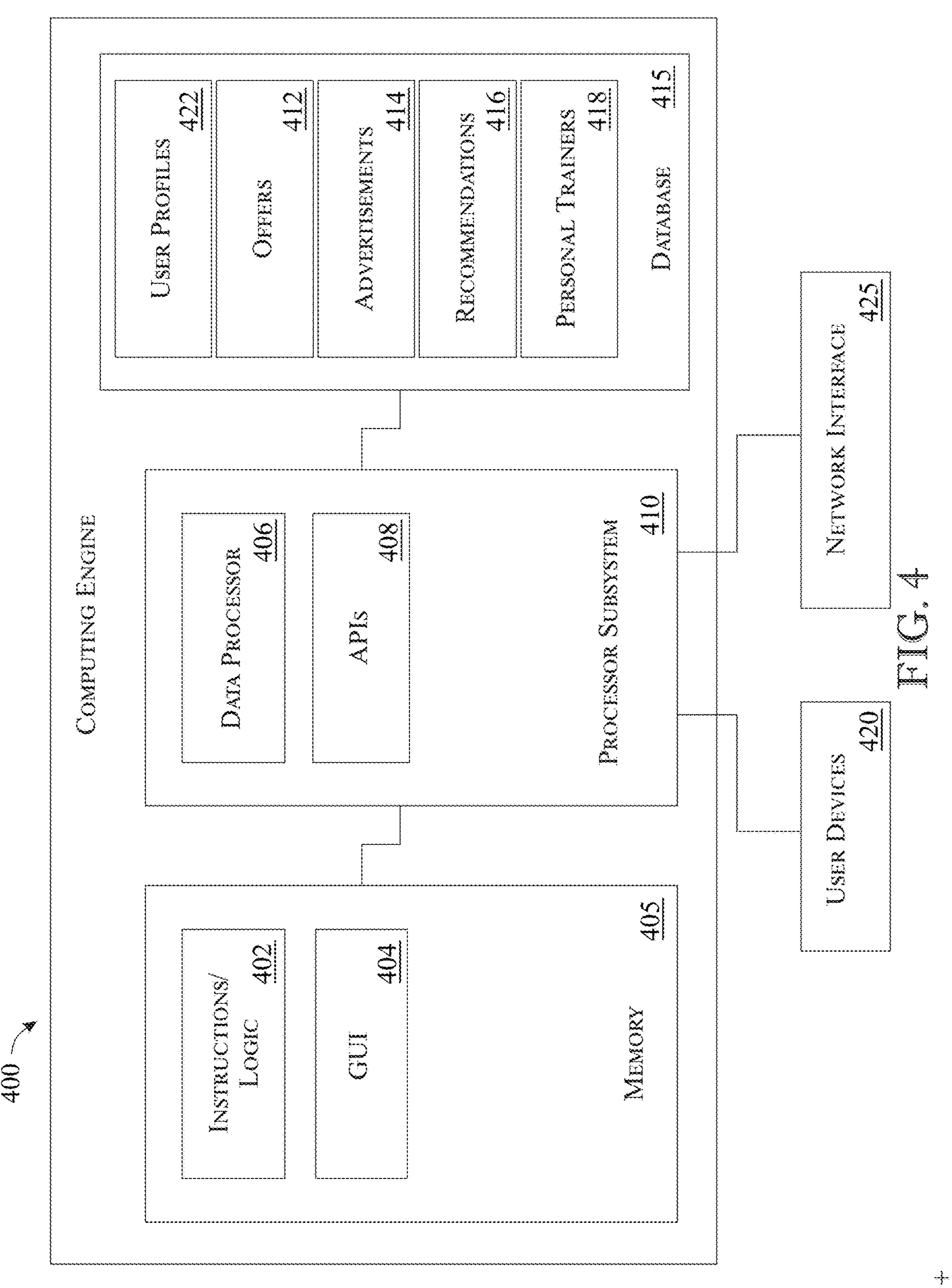
FIG. 4 shows an exemplary block diagram of a computing engine within which certain features of the method of the present disclosure can be implemented, in accordance with some embodiments of the present disclosure.

FIG. 4 shows an exemplary block diagram of a computing engine 400 within which certain features of the present disclosure can be implemented, in accordance with some embodiments of the present disclosure. The computing engine 400 may be similar in functioning and configuration to the AI-based computing engine 345, as described above in detail in relation to FIG. 3. The computing engine 400 may comprise various function blocks that are involved in the functioning of the system of the present invention. The computing engine 400 may comprise a memory 405 to store instructions/logic 402 and a graphical user interface (GUI) 404. The instructions/logic 402 stored in the memory 405 may comprise the core programming code and algorithms that drive functionality of the system and methods of the present invention.

The instructions/logic 402 may be responsible for various aspects of system operation, including data processing, encoding, validation, authentication, manipulation, and storage. The instructions/logic 402 may determine how data is received, validated, encoded, transformed, or stored within a database 415 or other storage systems. Additionally, the instructions/logic 402 may also define logic flow of the system, controlling the sequence of operations, decision-making processes, and error handling mechanisms. Furthermore, the instructions/logic 402 may also enable the system to interact with external resources, such as APIs (Application Programming Interfaces) or services that facilitate the exchange of data, enabling communication and integration with other systems or platforms. Moreover, the instructions/logic 402 may further enable the system to respond to user interactions and inputs by defining how user actions are processed, triggering appropriate responses, updates, or changes in the state of the system. The instructions/logic 402 may handle user requests, validate input data, perform required computations, and generate responses or feedback to provide a seamless and interactive user experience.

The GUI 404 in the memory 405 may encompass the visual components, user interface elements, and interactive elements that constitute the user-facing part of the system. The GUI 404 may be similar in functioning and configuration to the user interface 315, as described above with relation to FIG. 3. The GUI 404 may include layouts, templates, stylesheets, images, icons, or other graphical assets used to present the interface to the users. The GUI 404 may provide an intuitive and visually appealing environment through which the users may interact with the system, input data, configure settings or parameters, navigate through different screens or pages, and receive feedback or responses. The GUI 404 may be implemented using web technologies such as HTML, CSS, and JavaScript. The users may also interact with various elements on the GUI 404, such as buttons, checkboxes, dropdown lists, and text fields, to provide input or trigger system operations. The GUI 404 may be stored within the memory 405 of the computing engine 400 or may be hosted on web servers, allowing the users to access the GUI 404 remotely through web browsers or client applications.

Further, the computing engine 400 may comprise a processor subsystem 410 to execute instructions to perform or control performance of certain operations. The instructions may comprise instructions to determine if a mobile application associated with the membership-based venue is downloaded at a user device, instructions to automatically grant a membership of the membership-based venue to a user associated with the user device in response to determining that the mobile application is downloaded at the user device, and instructions to send one or more offers associated with the membership-based venue to the user via the mobile application, wherein sending the one or more offers comprising providing an access to the membership-based venue for a limited amount of time in a period of time.

The processor subsystem 410 may comprise a data processor 406 and one or more APIs 408 to execute the above instructions. The data processor 406 may process data received from user inputs via GUI 404, and the database 415. The data processor 406 may utilize parallel processing techniques to optimize performance and speed up calculations, thus allowing efficient utilization of computational resources and accelerating the processing of large datasets, improving system responsiveness and performance. Further, the data processor 406 may also comprise real-time or near real-time data processing capabilities. The APIs 408 may enable different software components of the system to communicate with each other.

The database 415 may be similar in configuration and functioning to the database 320 (as described above in detail in relation to FIG. 3). The database 415 may store information corresponding to offers 412, advertisements 414, recommendations 416, personal trainers 418, and user profiles 422.

The user profiles 422 may comprise essential information about each user, allowing for personalized experiences and interactions within the mobile application. The user profiles 422 may enable the mobile application to tailor the services, content, and recommendations to meet the specific needs and preferences of each user. The user profiles 422 may comprise personal details such as, but not limited to, a full name, date of birth, a contact information (an email address and a phone number), a profile picture or an avatar of the users, a virtual badge of the user, or user credentials comprising usernames and securely hashed passwords. The user profiles 422 may further comprise information related to the membership of the users with the membership-based venue, including membership type, duration, renewal status, or upgrade status. The user profiles 422 may also comprise details about the fitness goals, wellness goals, interests, or preferences of the users to enable the mobile application to provide targeted content and recommendations to the users.

Further, the user profiles 422 may also record the user activity within the mobile application. The user profiles 422 may also be used for user authentication, ensuring that only authorized individuals may access the accounts and the features of the mobile application. The users may view and manage the membership details, including renewal or upgrade options and membership type changes, through the user profiles 422. The users may use the user profiles 422 to browse, book, and manage the attendance at the membership-based venue events and classes. Contact information stored in the user profiles 422 may facilitate communication between the mobile application and the users, including email notifications and push notifications for one or more updates and recommendations.

The offers 412 may comprise promotions, discounts, or incentives extended to the users as a part of the membership benefits. The offers 412 may be tailored to individual users based on the preferences, behavior, and membership status of the users. The offers 412 may be designed to provide the users with benefits and incentives, thus enhancing engagement and participation within the membership-based venue. The offers 412 may further comprise discounts on membership upgrades, event tickets, class bookings, or merchandise purchases. The offers 412 may also reward the users for specific actions or engagements within the mobile application, such as referring friends, attending a certain number of events, or achieving fitness milestones. The users may redeem offers through the mobile application by applying a promotional code or clicking on a designated link to access the discounted pricing, special promotion, or a referral program.

The advertisements 414 may comprise promotional content or messages that are presented to the users within the mobile application. The advertisements 414 may engage the users, inform the users about events or offers, and may also serve as a source of revenue for the membership-based venue. The advertisements 414 may be targeted based on user demographics, behavior, or preferences to ensure relevance.

The recommendations 416 may comprise personalized suggestions and content that is offered by the mobile application to the users based on the behavior, preferences, or interactions of the users within the mobile application. The personal trainers 418 may offer guidance, support, and expertise to the users on the fitness and wellness journeys of the users. Personal trainers 418 may offer tailored fitness plans, workout routines, nutritional advice, and motivation to help users achieve the health and wellness goals. The users may also communicate with the personal trainers 418 through the mobile application, enabling real-time support and guidance.

User devices 420 and network interface 425 may be similar in functioning and configuration to the user devices 310 and the network interface 340 as described above in detail with relation to FIG. 3. The information is not repeated herein for the sake of brevity.

FIG. 5 illustrates a non-transitory computer readable medium 500 comprising instructions executable by a processor to perform or control performance of operations of the present disclosure. The instructions may comprise instructions to cause the processor to perform or control performance of operations of the example method 100. The instructions may comprise instructions 502 to determine if a mobile application associated with the membership-based venue is downloaded at a user device. Further, the instructions may comprise instructions 504 to automatically grant a membership of the membership-based venue to a user associated with the user device in response to determining that the mobile application is downloaded at the user device. Furthermore, the instructions may comprise instructions 506 to send one or more offers associated with the membership-based venue to the user via the mobile application, wherein sending the one or more offers comprises providing an access to the membership-based venue for a limited amount of time in a period of time.

FIGS. 6A-6E are screencaptures of the user interface of the mobile application (e.g., mobile application 305) involved in the functioning of the methods of the present disclosure, in accordance with some embodiments of the present disclosure. The screencaptures shown in the FIGS. 6A-6E are associated with an embodiment, where the membership-based venue is a fitness center such as a gym. It is contemplated that the methods and systems described herein are applicable to other types of membership-based venues as well, such as, but not limited to, a club, a recreation center, a studio, a stadium, a workout facility, or the like.

Figures 6A, 6B:
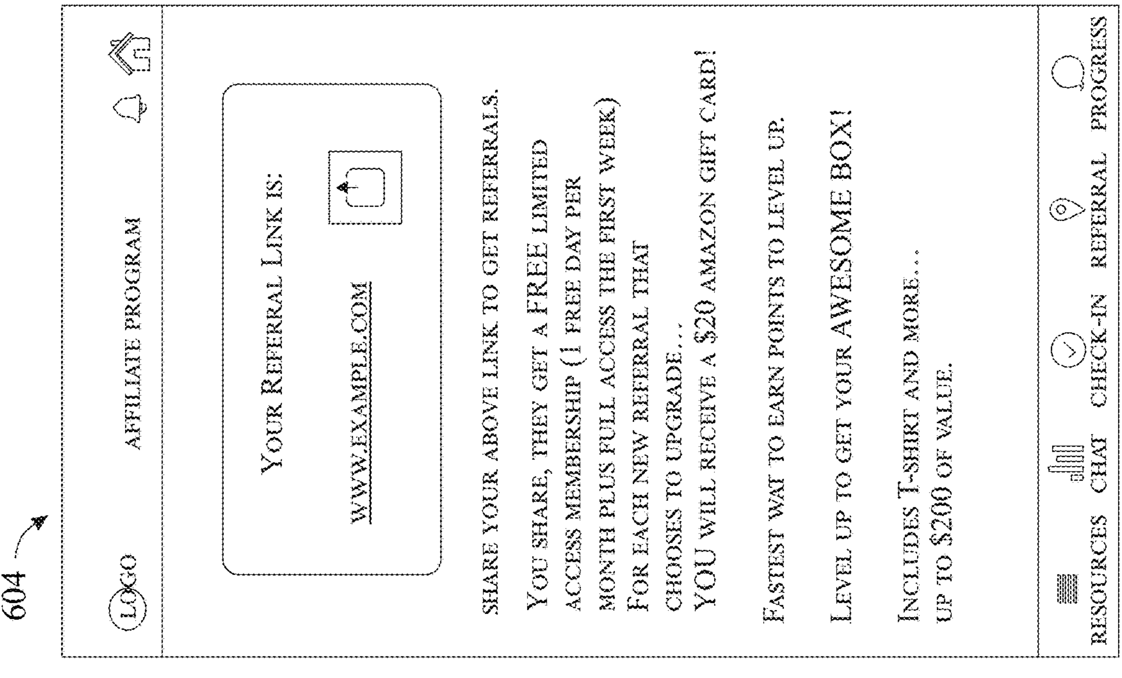
FIGS. 6A-6E show example screencaptures of the mobile application associated with the methods of the present disclosure, in accordance with some embodiments of the present disclosure.

FIG. 6A shows a screencapture 602 of the user interface associated with the mobile application. The user interface being rendered on the user device by the mobile application (under control of the computing engine) and representing a prompt for the user upon log in to allow the mobile application to track location of the user. The user is provided one or more options to allow the mobile application to track location of the user. The user may select the option to allow the mobile application to track the location of the user just once. The user may select the option to allow the mobile application to track the location of the user while using the mobile application only. The user may select the option to not allow the mobile application to track the location of the user.

The location of the user may be tracked by the mobile application in order to determine if the user is present at the membership-based venue. In response to determining that the user is present at the membership-based venue, a real-time experience may be provided to the user based on the interest or preferences of the user. The user may access the membership-based venue based on authentication enabled by the mobile application. For example, the user may access the membership-based venue by utilizing biometric authentication. The user may be assigned personal trainers that may assist the user to participate in the events or classes in which the user is interested based on the user activity on the mobile application. The personal trainer may further assist the user in one or more training activities based on the fitness goals of the user in the mobile application.

FIG. 6B shows a screencapture 604 of the user interface associated with the mobile application. The user interface being rendered on the user device by the mobile application (under control of the computing engine) and representing a referral program or an affiliate program. The referral program or the affiliate program may enable the user to earn one or more rewards by sharing a referral link to other known individuals (friends and family) of the user. By referring the mobile application to the other known individuals, the user may earn points or rewards to level up and may receive gift boxes comprising gifts of up to $200 value. Upon sharing of the referral link, the other known individuals availing the referral link may achieve a free limited access membership (e.g., casual membership) with one free day per month along with full access in the first week. For each new referral choosing to upgrade the membership from the casual membership to the full-time membership, the user may avail a gift card of up to $20 value.

Figure 6D:
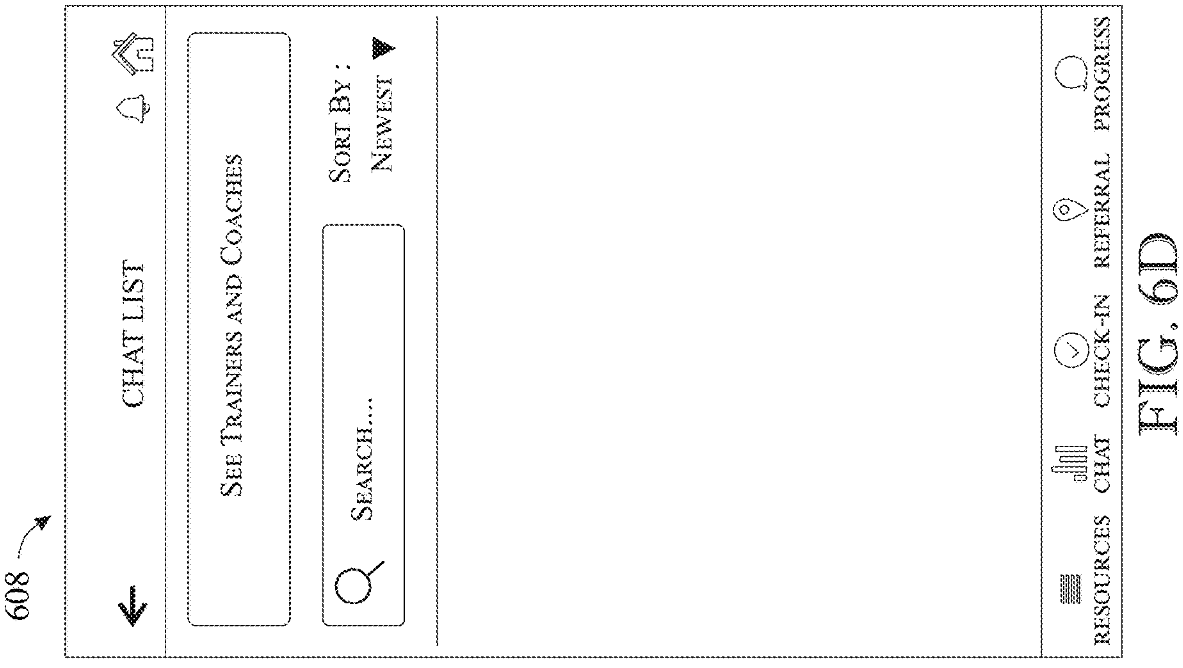
Figure 6C:

FIG. 6C shows a screencapture 606 of the user interface associated with the mobile application. The user interface being rendered on the user device by the mobile application (under control of the computing engine) and representing a home page. The home page may comprise UI elements corresponding to "start here", "transformation program", and "trainers and online coaches" sections. The users may select the "start here" section and may continue to explore the mobile application features. The users may register or login into the mobile application by utilizing a username, password, and a profile picture. Under the "transformation program" section, the users may explore the training programs, events, or classes as per the interest and preferences of the users. For example, the users may select one or more of: swimming, dancing, cardio or HIIT training programs as per the interest of the users. Further, as per the fitness goals of the users, personal trainers or online coaches may also be provided to the users under the "trainers and online coaches" section.

FIG. 6D shows a screencapture 608 of the user interface associated with the mobile application. The user interface being rendered on the user device by the mobile application (under control of the computing engine) and representing a chat list under "chat with fitpro" section. The mobile application may provide a platform to the users, where the users may interact with other members of the membership-based venue. For instance, if the user has shown interest in the group dancing classes, the user may interact with other members of the group class under the chat list. In addition, the users may also interact with the personal trainers or online coaches in order to access the fitness programs.

Figure 6E:
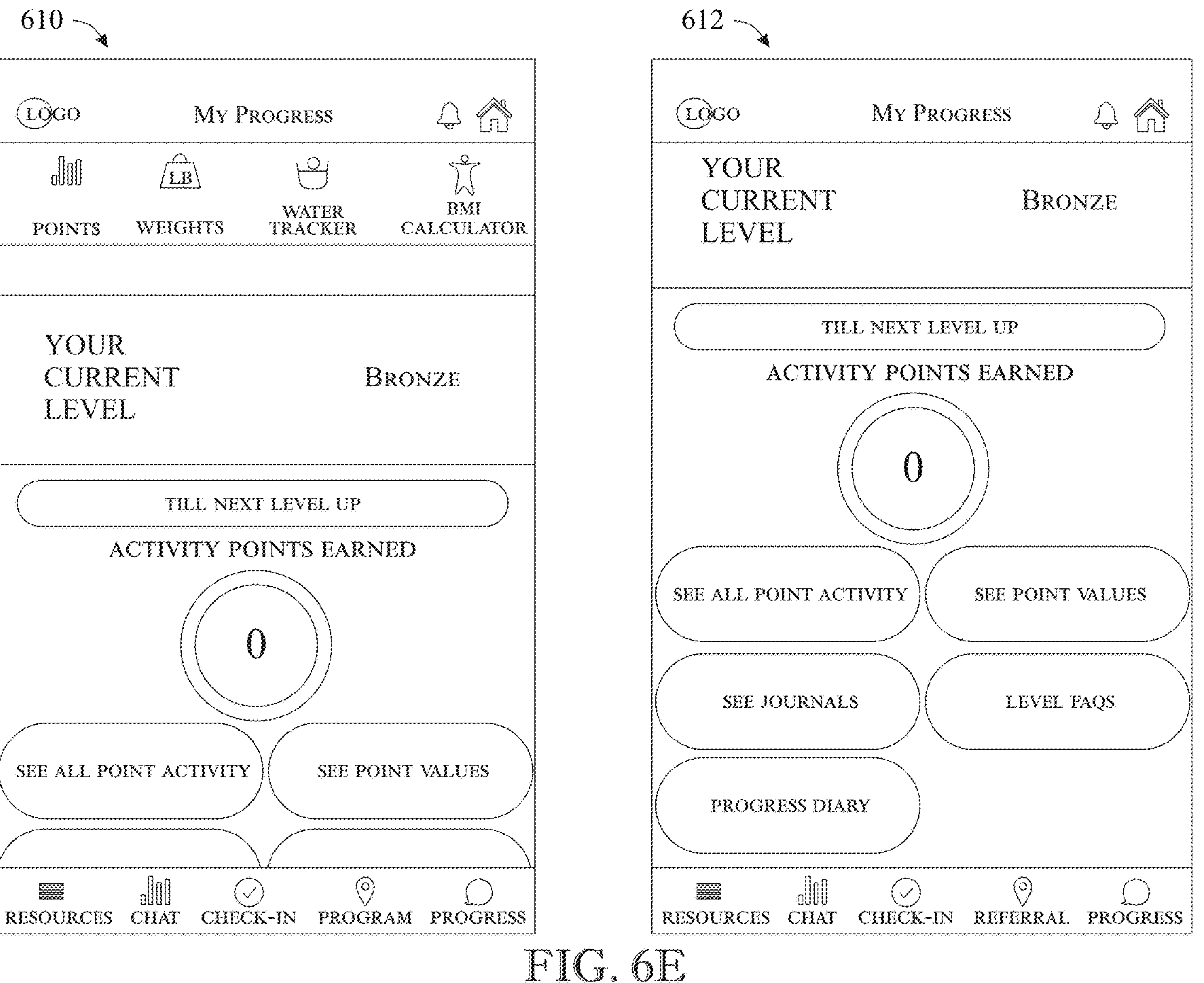

FIG. 6E shows screencaptures 610, 612 of the user interfaces of the mobile application, the user interface representing progress of a user under "my progress" section. The users may be assigned different levels such as, silver, bronze, or gold, based on the performance of the user. The users may earn activity points by participating in various fitness activities in the membership-based venue or online. Further, the users may earn point values based on the activity or referrals of the users. The users may also access journals, FAQs, or progress diary of the users.

The embodiments of the present invention disclose methods and systems for easing membership process and enabling access to a membership-based venue. In response to determining, that a mobile application is downloaded at a user device, a casual membership of the membership-based venue is automatically granted to a user associated with the user device for a limited time in a period of time. The user may provide basic details such as name and email address, which facilitates granting of the casual membership to the user. Further, the user activity on the mobile application may be tracked by a computing engine associated with the mobile application in order to determine interests and preferences of the user to provide personalized offers, recommendations, and advertisements to the user.

The casual membership may be accompanied with a one-day monthly pass, which may enable the user to access the membership-based venue for a one day in a month, without any cost. The user with the casual membership may be enabled to access the membership-based venue after the biometric authentication.

Further, a sales funnel may be incorporated into the mobile application in order to enhance the marketing and sales efficiency of the membership-based venue. The incorporation of the sales funnel into the mobile application may allow targeted outreach or incentive-based promotions to encourage downloads and availing of full-time membership by the user.

In addition, location of the user may be tracked by the computing engine upon obtaining user permissions. If it is determined, based on the tracking, that the user is present at the membership-based venue, a real-time personalized experience may be provided to the user in order to enhance the interest of the user to upgrade the casual membership to a full-time membership. The user may provide additional details, which may enable the computing engine associated with the mobile application of the membership-based venue to provide the full-time membership to the user. The full-time membership may provide the user with unlimited access to the membership-based venue.

The methods described herein may be performed using the systems described herein. In addition, it is contemplated that the methods described herein may be performed using systems different than the systems described herein. Moreover, the systems described herein may perform the methods described herein and may perform or execute the instructions stored in the CRSMs described herein. It is also contemplated that the systems described herein may perform functions or execute instructions other than those described in relation to the methods and CRSMs described herein.

Furthermore, the CRSMs described herein may store instructions corresponding to the methods described herein, and may store instructions which may be performed or executed by the systems described herein. Furthermore, it is contemplated that the CRSMs described herein may store instructions different than those corresponding to the methods described herein, and may store instructions which may be performed by systems other than the systems described herein. The methods, systems, and CRSMs described herein may include the features or perform the functions described herein in association with any one or more of the other methods, systems, and CRSMs described herein.

In some embodiments the method or methods described above may be executed or carried out by a computing system including a tangible computer-readable storage medium, also described herein as a storage machine, which holds machine-readable instructions executable by a logic machine (i.e., a processor or programmable control device) to provide, implement, perform, and/or enact the above-described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A computer-implemented method for facilitating access to a membership-based venue, the method comprising:

determining, by a computing engine, if a mobile application associated with the membership-based venue, is downloaded at a user device; and in response to determining that the mobile application associated with the membership-based venue is downloaded at the user device:

automatically granting, by the computing engine, a membership of the membership-based venue to a user associated with the user device upon download of the mobile application, wherein automatically granting the membership of the membership-based venue comprises:

receiving, by the computing engine via the mobile application downloaded on the user device, basic details associated with the user for registering the user with the mobile application, the basic details including one or more of name, profile picture, contact details, and email address while being devoid at least of financial information identification information, and documents;

automatically granting, by the computing engine, a casual membership of the membership-based venue to the user upon registration of the user with the mobile application using the basic details and without requiring the financial information, the identification information or the documents the casual membership being a guest pass that permits the user to access the membership-based venue for a limited amount of time within a pre-defined duration of time, without any costs; and sending, by the computing engine, one or more offers associated with the membership-based venue to the user via the mobile application.

2. The method of claim 1, further comprising:

providing, by the computing engine, via the mobile application, an option of upgrading the casual membership to a full-time membership to the user; and in response to receiving a user response to the option, upgrading the membership of the user from the casual membership to the full-time membership.

3. The method of claim 1, wherein providing the access to the membership-based venue comprises providing the access to the membership-based venue for one day per month.

4. The method of claim 1, further comprising:

monitoring, by the computing engine, user activity on the mobile application;

processing, by the computing engine, the user activity, and generating and sending personalized recommendations to the user, via the mobile application, based on processing the user activity.

5. The method of claim 1, further comprising:

tracking, by the computing engine, location of the user upon obtaining user permissions;

determining, by the computing engine, based on the tracking that the user is present at the membership-based venue; and enabling, by the computing engine, providing a real-time personalized experience at the membership-based venue to the user based on determining that the user is present at the membership-based venue.

6. The method of claim 1, wherein providing the access to the membership-based venue comprises providing one or more of a barcode, a QR code, a one-time password, a PIN, or a passcode to the user, via the mobile application, which enables the user to access the membership-based venue.

7. The method of claim 1, wherein providing the access to the membership-based venue comprises utilizing biometric authentication.

8. A computing engine, comprising:

a memory to store instructions; and one or more processors to execute the instructions stored in the memory to perform or control performance of operations that comprise:

determine if a mobile application associated with a membership-based venue, is downloaded at a user device; and in response to determining that the mobile application associated with the membership-based venue is downloaded at the user device:

automatically grant a membership of the membership-based venue to a user associated with the user device upon download of the mobile application, wherein to automatically grant the membership, the operations comprise:

receive, via the mobile application downloaded on the user device, basic details associated with the user for registering the user with the mobile application, the basic details including one or more of name, profile picture, contact details and email address while being devoid at least of financial information, identification information, and documents:

automatically grant a casual membership of the membership-based venue to the user upon registration of the user with the mobile application using the basic details and without requiring the financial information, the identification information, or the documents the casual membership being a guest pass that permits the user to access the membership-based venue for a limited amount of time within a pre-defined duration of time, without any costs; and send one or more offers associated with the membership-based venue to the user via the mobile application, wherein the one or more offers comprise an access to the membership-based venue for a limited amount of time in a period of time.

9. The computing engine of claim 8, wherein the operations further comprise:

provide an option of upgrading the casual membership to a full-time membership to the user; and in response to receipt of a user response to the option, upgrading the membership of the user from the casual membership to the full-time membership.

10. The computing engine of claim 8, wherein the access is for one day per month.

11. The computing engine of claim 8, wherein the operations further comprise:

monitor user activity on the mobile application;

process the user activity, and generate and send personalized recommendations to the user, via the mobile application, based on the user activity.

12. The computing engine of claim 8, wherein the operations further comprise:

track location of the user upon obtaining user permissions;

determine, based on the tracking, that the user is present at the membership-based venue; and enable providing a real-time personalized experience at the membership-based venue to the user based on determining that the user is present at the membership-based venue.

13. The computing engine of claim 8, wherein the operation to provide the access comprises an operation to provide one or more of: a barcode, a QR code, a one-time password, a PIN, or a passcode to the user, via the mobile application, which enables the user to access the membership-based venue.

14. The computing engine of claim 8, wherein the operation to provide the access to the membership-based venue comprises an operation to utilize biometric authentication.

15. A non-transitory computer-readable storage medium comprising instructions executable by a processor, the instructions to cause the processor to perform or control performance of operations that comprise:

determine if a mobile application associated with a membership-based venue, is downloaded at a user device; and in response to determining that the mobile application associated with the membership-based venue is downloaded at the user device:

automatically grant a membership of the membership-based venue to a user associated with the user device upon download of the mobile application, wherein to automatically grant the membership, the operations comprise:

receive, via the mobile application downloaded on the user device, basic details associated with the user for registering the user with the mobile application, the basic details including one or more of name, profile picture, contact details, and email address, while being devoid at least of financial information, identification information, and documents;

automatically grant a casual membership of the membership-based venue to the user upon registration of the user with the mobile application using the basic details and without requiring the financial information, the identification information, or the documents, the casual membership being a guest pass that permits the user to access the membership-based venue for a limited amount of time within a pre-defined duration of time, without any costs; and send one or more offers associated with the membership-based venue to the user via the mobile application, wherein the one or more offers comprise an access to the membership-based venue for a limited amount of time in a period of time.

* * * * *